Aug. 20, 1929. A. C. GARNETT 1,725,264
SUSPENDED CARRIER
Filed Jan. 15, 1927 2 Sheets-Sheet 1
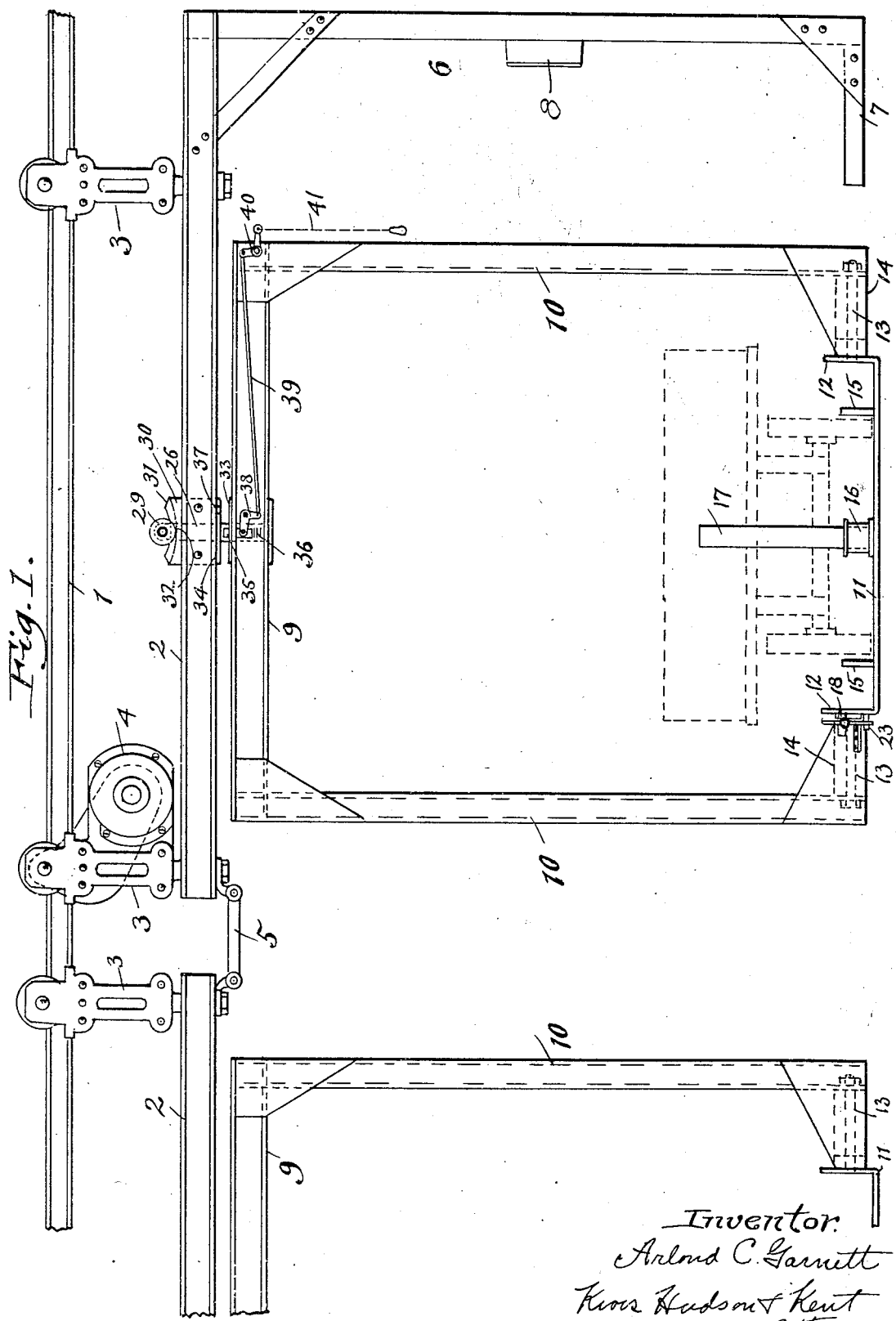
Inventor.
Arlond C. Garnett
Knox Hudson & Kent
Attys Aug. 20, 1929.　　　A. C. GARNETT　　　1,725,264
SUSPENDED CARRIER
Filed Jan. 15, 1927　　　2 Sheets-Sheet 2
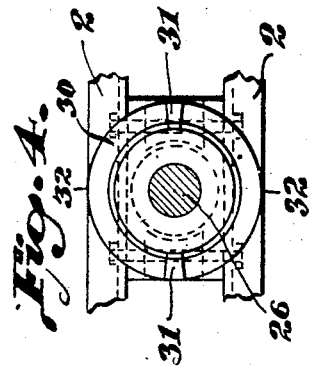
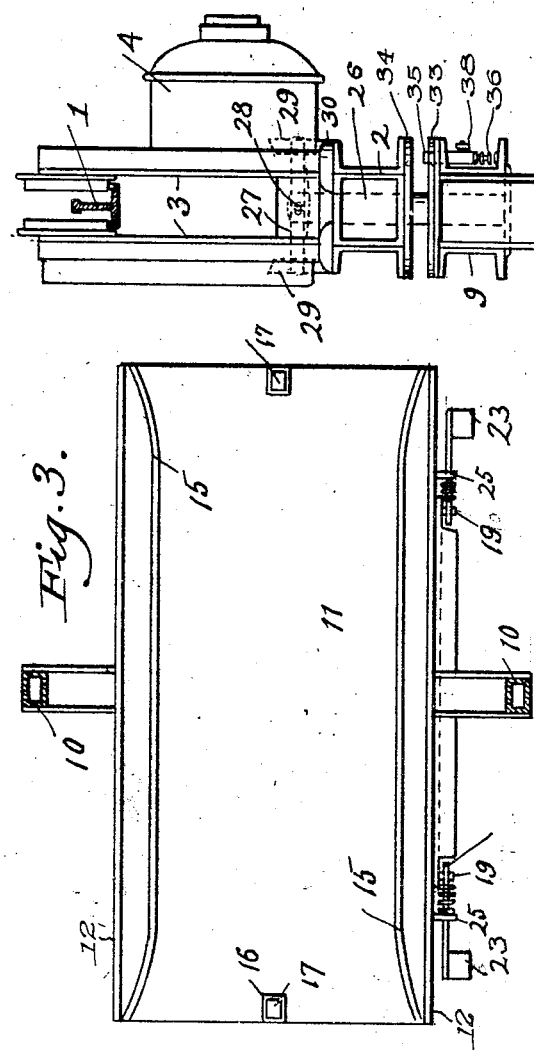
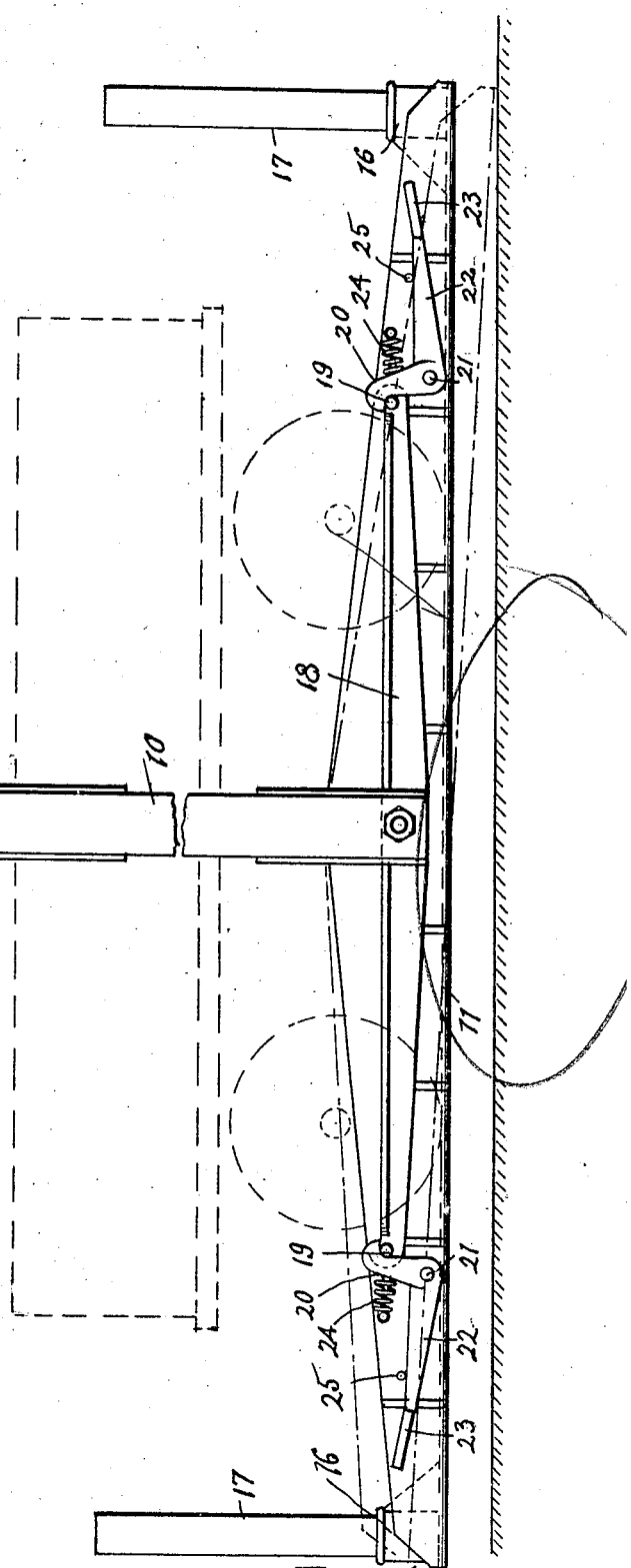

Patented Aug. 20, 1929.

1,725,264

UNITED STATES PATENT OFFICE.

ARLOND C. GARNETT, OF WICKLIFFE, OHIO, ASSIGNOR TO THE CLEVELAND CRANE AND ENGINEERING COMPANY, OF WICKLIFFE, OHIO, A CORPORATION OF OHIO.

SUSPENDED CARRIER.

Application filed January 15, 1927. Serial No. 161,330.

This invention relates to suspended carriers of the type adapted to travel along an overhead track. While the present invention is of general utility as a load carrier it is especially applicable to the transportation of loaded or empty wheeled vehicles such as trucks.

An object of the present invention is to provide a suspended platform carrier in which the platform is mounted in a frame which turns about a vertical axis so that the platform may be shifted from a load transporting position parallel to the trackway to a loading or unloading position in which it is disposed transversely with respect to the trackway.

A further object is to provide a pivoted platform carrying frame with supporting and holding means by which the frame may be held in a position such that the platform is disposed parallel with the trackway but which upon release will automatically move to a position in which the platform is disposed transversely with respect to the trackway.

A further object is to so support the platform frame that it will be automatically lowered when it is swung to position the platform transversely of the trackway and will be automatically raised when it is swung to position the platform parallel with the trackway.

A further object is to provide a truck receiving platform which is so mounted that either end thereof may be swung down into engagement with the floor to permit a wheeled vehicle to be run from the floor onto the platform.

A further object is to provide a tilted platform which is so mounted that it will be automatically shifted to horizontal position by the weight of a vehicle thereon.

With the above and other objects in view, the invention may be said to comprise the device as illustrated in the accompanying drawings hereinafter described and particularly set forth in the appended claims together with such variations and modifications thereof as will be apparent to one skilled in the art to which the invention appertains.

Reference should be had to the accompanying drawings forming a part of the specification in which:

Fig. 1 is a side elevation showing an overhead trackway and a portion of a train of carriers thereon.

Fig. 2 is an end elevation of a carrier showing the platform supported in a position transverse with respect to the trackway.

Fig. 3 is a top plan view of the platform.

Fig. 4 is a detail plan view of a circular cam track employed in connection with the invention.

Referring to the accompanying drawings the carrier of the present invention is shown mounted to travel along an overhead trackway 1 and the carrier includes a suitable carriage mounted on the trackway which consists of a load bar 2 extending parallel with the trackway beneath the same and supported at its opposite ends by suspended trucks 3 provided with suitable supporting wheels which travel upon the overhead track. One of the trucks 3 may be provided with a suitable propelling motor 4 and a number of the trucks may be connected together in a train with the individual carriages connected by couplings 5 as shown in Fig. 1. The end carriage of a train is provided with a standard 6 secured to one end thereof and this standard serves to support an operator's platform 7 and a controller 8 by which the current to the propelling motor or motors is controlled.

The platform carrying frame consists of a horizontal top bar 9 to the opposite ends of which are attached depending standards 10 which form the supports for a truck receiving platform 11 which is disposed transversely of the frame and mounted between the lower ends of the standards. Platform 11 is preferably formed of sheet metal and is provided with upstanding side flanges 12 which are connected to the standards 10 midway between the ends of the platform by horizontal pivot pins 13 which extend through spacing blocks 14 interposed between the lower ends of the standards and the flanges of the platform. The guide bars 15 are mounted upon the platform inwardly of the side flanges 12 and these guide bars are flared at their opposite ends, as shown in Fig. 3, to guide the wheels of the truck toward the center of the platform as the truck is moved onto the platform. At each end thereof the platform is provided with a central stake socket 16 adapted to receive a stake 17 to prevent a truck from running off the end of the platform. A horizontally disposed transverse bar 18 is rigidly secured midway between its ends to the lower end of one of the standards 10 and extends alongside of the platform. This bar is provided with laterally projecting pins 19 at its opposite ends which are adapted to be engaged by hooks 20, each of which forms one arm of a bell crank lever pivoted at 21 to the side flange 12 of the platform. Each bell crank lever has a long arm 22 extending outwardly from the pivot and terminating in a treadle 23. The hook arms 20 are engaged by coil springs 24 which serve to normally hold the arms 20 in engaging positions and stop pins 25 are provided on the flange 12 to limit the upward movement of the arms 22. Each of the hook arms 20 when in engagement with its pin 19 serves to prevent downward movement of the end of the platform to which it is attached but either end of the platform is free to swing upwardly when the opposite end is released. It will, therefore, be apparent that when either arm 22 is depressed by stepping on the treadle 23 the arm 20 will be swung out of engagement with the pin 19 releasing the end of the platform and permitting the same to swing downwardly into engagement with the floor. The stake 17 may be removed from the end of the platform in engagement with the floor and a loaded or empty truck may be run up onto the platform. As soon as the center of gravity of the truck has passed the central pivot 13 of the platform the platform will be immediately swung to horizontal position by gravity. Movement of the hook arm 20 past its pin engaging position upon release of the treadle is prevented by the stop pin 25 and during the upward movement of the lowered end of the platform the pin 19 engages with the tapered end of the upwardly moving arm 20 shifting the arm outwardly, allowing the hook portion of the arm to pass the pin, whereupon the spring 24 will snap the hook into engagement with the pin to lock the platform in load carrying position. To unload a truck the operator merely steps upon the treadle 23 at the end of the platform from which it is desired to discharge the truck and by the weight imposed upon the treadle releases the hook from the pin and forces the end of the platform down into engagement with the floor, the stake 17 having first been removed, the truck on the platform will run by gravity free of the platform onto the floor.

It is usually more convenient to load and unload the trucks laterally to and from the carrier but while the trucks are being conveyed it is desirable that the platform be disposed parallel with the trackway. In order that the platform may be disposed either in the position convenient for loading and unloading or in the position convenient for transportation, the platform carrying frame is so suspended from the carriage that it may be swung about a vertical axis from a position in which the platform is disposed transversely to the trackway to a position in which the platform is disposed parallel with the trackway. The top bar 9 of the platform supporting frame has fixed thereto midway between its ends a vertical supporting post 26 which extends upwardly through the load bar 2 and carries at its upper end a transverse bar 27 connected centrally thereto by a horizontal pivot 28. The bar 27 carries beveled wheels 29 at its opposite ends and these wheels run upon a supporting circular cam track 30 mounted upon the top of the load bar 2. This track has diametrically opposite elevated portions 31 at the front and rear of the post 26 and depressed portions 32 at opposite sides of the load bar. When the rollers 29 are resting upon the elevated portions 31 of the cam track the platform supporting frame is in a position such that the platform 11 is supported parallel with the trackway and when the supporting rollers 29 are resting in the depressed portion of the cam track the frame is held in a position such that the platform is disposed transversely with respect to the trackway. Means is provided for releasably holding the frame against turning movement when it is in the position in which the rollers 29 are resting upon the elevated portions of the cam track so that when the frame is released the weight thereof will cause the rollers 27 to roll downwardly into the depressed portions of the cam track whereby the frame is automatically turned to a position in which the platform is disposed transversely with respect to the trackway. A bearing plate 33 is mounted upon the upper side of the top bar 9 of the platform supporting frame and this plate is adapted to engage with a similar bearing plate 34 attached to the under side of the load bar 2 when the platform supporting frame is in its uppermost position. A vertically movable latch pin 35 is slidably mounted in the top bar 9 and projects through an opening in the plate 33. This pin is pressed upwardly by means of a compression spring 36 and when the platform carrying frame is swung to a position at right angles to that shown in Fig. 1 and simultaneously raised to its uppermost position the pin 35 will snap into a recess 37 in the bearing plate 34 and will hold the frame against turning movement. After the platform has been loaded or unloaded the operator will swing the platform carrying frame through 90° causing the rollers 29 to travel up the inclined portions of the cam track 30 lifting the load carrying frame until the upper end of the latch pin 35 bears against the plate 34, and further movement will cause the pin 35 to slide along the plate 34 until it registers with the recess 37, whereupon, it will be snapped into the recess 36, locking the frame against movement. Means is provided for manually releasing the pin 35 so that the platform carrying frame will descend by gravity and automatically swing to a position in which the platform is disposed transversely with respect to the trackway. The manually operable releasing means consists of a bell crank lever 38 pivoted to the top bar 9 of the frame and having one arm thereof attached to the pin 35 and the other arm thereof attached to a connecting rod 39 which extends to one arm of the bell crank 40 pivotally mounted at one end of the top bar 9, the other arm of the bell crank 40 having attached thereto a depending cable 41 which when pulled downwardly rocks the bell cranks 40 and 38 and depresses the pin 35 to free the same from the recess 37 and permit the frame to automatically swing to load receiving position.

Having thus described my invention, what I claim is:

1. A carrier comprising a carriage adapted to travel along an overhead trackway, a frame suspended from the carriage to swing about a vertical axis, an elongated load supporting platform carried by the frame at the lower end thereof, said frame being open at the end to receive a wheeled truck upon said platform, and means for holding said frame in a position in which the platform is parallel with the trackway or in a position in which the platform extends transversely of the trackway.

2. A carrier comprising a carriage adapted to travel along an overhead trackway, a frame suspended from the carriage to swing about a vertical axis, a load supporting platform carried by the frame at the lower end thereof, and means for supporting said frame including a cam for elevating the frame when the same is turned in one direction and for lowering the same when it is turned in the opposite direction.

3. A carrier comprising a carriage adapted to travel along an overhead trackway, a frame suspended from the carriage to swing about a vertical axis, a load supporting platform carried by the frame at the lower end thereof, means for supporting said frame including a cam for elevating the frame when the same is turned in one direction and for lowering the same when it is turned in the opposite direction, and means for detachably securing the frame in elevated position.

4. A carrier comprising a carriage adapted to travel along an overhead trackway and having a load bar beneath the trackway, a frame carrying a platform and having a vertical centrally disposed post extending through the load bar, rollers carried by the post, a cam on the load bar adjacent the post forming a track for said rollers, said cam having depressed portions so disposed as to support the frame with the platform disposed transversely with respect to the load bar and elevated portions for supporting the frame with the platform parallel to the load bar, and means for detachably securing the frame against turning movement with the rollers in engagement with the elevated portions of the cam.

5. A truck carrier comprising a carriage adapted to travel along an overhead trackway, a frame suspended from said carriage, a truck receiving platform pivoted substantially midway between its ends to the lower end of said frame and extending transversely of the frame, and a latch carried by the platform at each end thereof, said latches being engageable with the frame to hold the platform in horizontal position, either latch being releasable to permit the end of the platform to which it is attached to move down into engagement with the floor.

6. A carrier comprising a carriage adapted to travel along an overhead trackway, a frame suspended from said carriage to swing about a vertical pivot, a load receiving platform at the lower end of said frame, and means for releasably retaining said frame in a position in which the said platform is parallel with the trackway, said frame being movable to a position in which the platform extends transversely with respect to the trackway.

7. A carrier comprising a carriage adapted to travel along an overhead trackway, a frame suspended from said carriage to swing about a vertical pivot, a load receiving platform pivoted midway between its ends to the lower end of the frame, and means for holding said platform in horizontal position, said means being releasable to permit an end of the platform to swing down into engagement with the floor.

8. A truck carrier comprising a carriage adapted to travel along an overhead trackway, a frame suspended from said carriage, said frame comprising spaced vertical standards, and a transverse bar fixed at its center to the lower end of one of said vertical standards, a truck receiving platform mounted between said standards and pivoted midway between its ends thereto so that either end may be swung down into engagement with the floor, and means interposed between said platform at opposite ends thereof and said transverse bar to support opposite ends of the platform, each supporting means permitting upward movement of the end of the platform which it supports whereby when one end of the platform is released said end may be moved downwardly into engagement with the floor.

9. A truck carrier comprising a carriage adapted to travel along an overhead trackway, a frame suspended from said carriage, said frame comprising spaced vertical standards, and a transverse bar fixed at its center to the lower end of one of said vertical standards, a truck receiving platform mounted between said standards and pivoted midway between its ends thereto so that either end may be swung down into engagement with the floor, sockets at opposite ends of the platform adapted to receive stakes for retaining a truck on the platform, and releasable means at each end of the platform engageable with said transverse bar, each releasable means being adapted to support one end of the platform against downward movement.

10. A truck carrier comprising a carriage adapted to travel along an overhead trackway, a frame suspended from said carriage, said frame comprising spaced vertical standards, and a transverse bar fixed at its center to the lower end of one of said vertical standards, a truck receiving platform mounted between said standards and pivoted midway between its ends thereto so that either end may be swung down into engagement with the floor, and a latching device carried by the platform at each end, each latching device being engageable with said transverse bar to prevent downward movement of the end of the platform upon which it is mounted, each latching device including a treadle by which it may be released.

11. A truck carrier comprising a carriage, a frame suspended from said carriage, a truck-receiving platform, and means on the lower end of said frame for pivotally supporting said platform intermediate the ends thereof, and releasable means for holding said platform against pivotal movement, whereby either end thereof may be caused to swing downwardly upon said pivotal support.

In testimony whereof, I hereunto affix my signature.

ARLOND C. GARNETT.